Patented July 17, 1928.

1,677,392

UNITED STATES PATENT OFFICE.

MORRIS S. KHARASCH, OF COLLEGE PARK, INDIANA.

WATER-SOLUBLE ORGANIC COMPOUND OF ARSENIC AND PROCESS OF PRODUCING IT.

No Drawing.    Application filed January 22, 1927.   Serial No. 162,925.

The present invention relates to water-soluble organic arsenious compounds, in which the arsenic is bonded by one bond to a carbon atom of an organic radical; and to the process of producing such water-soluble organic arsenious compounds.

More specifically, the water-soluble organic arsenious compounds which are produced by my invention have the arsenic atom bonded by one bond to a carbon atom of an organic radical, and have the arsenic atom bonded by its two remaining bonds to sulphur atoms, and have each sulphur atom bonded to a carbon atom of an organic radical containing an acid group which as a free valence bond capable of being attached either to hydrogen or to a metal. While my invention contemplates that the first-named organic radical shall be either an aliphatic or an aromatic radical, yet I prefer that it be an aromatic radical, specifically a phenyl radical, and desirably that it be a substituted aromatic radical, and specifically a substituted phenyl radical in which one or more of the hydrogen atoms of the phenyl group have been replaced by an amine group or groups, and/or by a hydroxyl group or groups, and/or by a substituted amine or hydroxyl group or groups. The organic radical bonded to the sulphur may be either aliphatic or aromatic.

In the past, organic compounds of trivalent arsenic have found very limited application as therapeutic agents, due to the fact that they are insoluble in water, and are even insoluble in an alkali solution unless the alkalinity of the solution is very great. Illustrations of such known organic compounds of trivalent arsenic are:

(1) Phenyl arsenious oxide:

(2) P-amino phenyl arsenious oxide:

These compounds while soluble in strong sodium hydroxide solution to give the salts

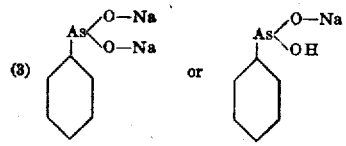

and

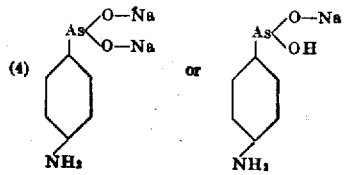

respectively, (the salt formed in each depending on the concentration of the alkali used,) precipitate the oxides of formulas 1 and 2 above as soon as any attempt is made to bring them to a hydrogen ion concentration where they are suitable for use for intravenous or subcutaneous injection.

These properties of such organic compounds of trivalent arsenic heretofore known have limited their application to a very large extent.

Thus, while derivatives of organic compounds of pentavalent arsenic have found considerable application as general therapeutic agents, especially as antisyphilitics, the organic compounds of trivalent arsenic, although enormously more effective, have not met with any degree of success and have generally been regarded as an unpromising field.

By my invention, I make organic compounds of trivalent arsenic effectively available, for uses generally similar to those of organic compounds of pentavalent arsenic.

In my Patent No. 1,589,599, granted June 22, 1926, I describe a general method whereby organo-metallic compounds can be introduced into water solution by the use of acids containing sulfhydryl groups; including thioglycollic acid, $\beta$-sulfhydryl butyric acid, thiomalic acid, thiosalicyclic acid, sulfhydryl benzene sulfonic acid, mercapto benzothiazole carboxylic acid, and substitution products of such acids, as well as other compounds containing a sulfhydryl (—SH) group or groups and an acidic group or groups such as the carboxylic group (—COOH) or the sulfonic group (—SO$_3$H).

That patent, although including claims covering generically certain water-soluble organo-metallic compounds and the process of producing them when the metal M therein referred to has a valence greater than one, and although giving an arsenic compound as one example of such generic type of compounds, was directed in its more specific claims to mercury compounds; so that claims directed specifically to arsenic compounds could not be obtained therein. This present application, on the other hand, is directed specifically to arsenic compounds; and while its more generic claims include the potassium salt of phenyl arsenious thioglycollic acid described in my prior patent, since that compound could not be claimed specifically in that patent the more specific claims of the present application are directed to substituted-aromatic trivalent-arsenic thio-acid compounds, especially to substituted-phenyl trivalent-arsenic thio-acid compounds, and their derivatives, and to the process of producing them.

This present invention permits the production of organic trivalent-arsenic compounds which are therapeutically active, which have a relatively small toxicity, and which are quite readily soluble in water.

For instance, if the sparingly soluble p-amino phenyl arsenious oxide given under formula 2 above is treated, in a suitable solvent, with a thio-acid, such as thiosalicylic acid, the following reaction takes place:

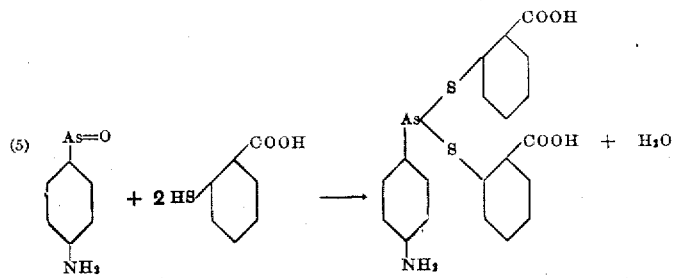

This is a compound which is readily soluble in sodium bicarbonate solution, and is soluble in the calculated amount of sodium hydroxide solution. In either case, the sodium salt is formed, and this sodium salt is soluble in water. The reaction with the sodium hydroxide, for instance, is obviously as follows:

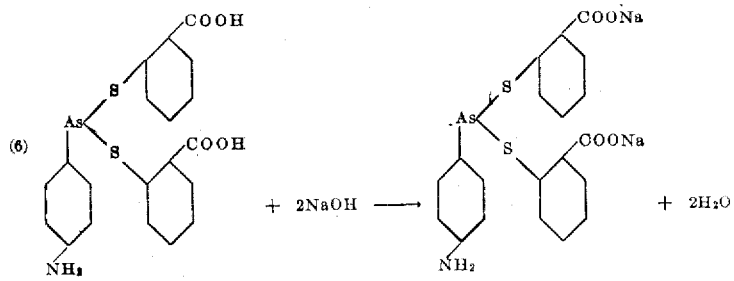

Of course, this sodium salt is given merely as one example; as obviously other salts may also be produced, such for instance as the potassium, calcium, or ammonium salts as other examples of salts of metals which would be relatively non-toxic and would ordinarily be soluble in water. The alkali metals are preferable, although my invention is not limited to alkali metals in forming these salts.

For the initial organic trivalent-arsenic compounds used in the preparation of substances of my present invention, the general formula may be (7) $R-As=Y$, in which R is any organic radical having a carbon atom directly attached by one bond to the arsenic, and Y is a non-metallic divalent atom other than of the sulphur family (in which family I mean to include sulphur, selenium, and tellurium and these only) or two non-metallic monovalent atoms. The organic radical which R represents may broadly be any organic radical of the aliphatic or aromatic series; but I prefer that it be an aromatic radical, such as the phenyl group, and that this aromatic radical be a substituted aromatic radical, such as a substituted phenyl group; and in some cases it seems better that Y be a single atom of oxygen, rather than two atoms of chlorine, for instance, so that the final compound will be formed with the setting free of water only rather than of a halogen acid; in which case the initial arsenic compound would be of the general formula $R-As=O$.

For the thio acid used in the process, the general formula is $H-S-R_{Ac}-H$ in which $R_{Ac}$ is an aromatic or aliphatic organic radical having a carbon atom attached to the sulfhydryl group and also containing an acid group which has a free valence bond capable of being attached either to hydrogen to form the acid, as shown, or to a metal to form a salt of such acid. This would give a final product containing a radical of the following typical formula:

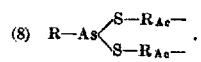

In this final product, the arsenic atom is directly bonded by one bond to a carbon atom of the radical R, and is directly bonded by two bonds to sulphur atoms; and each sulphur atom is directly bonded by one bond to a carbon atom of an organic radical which contains an acid group such as above defined; so that such product, by the substitution of sodium or potassium for hydrogen at the free bond of the acid group, permits the preparation of a sodium or potassium salt soluble in water.

Indeed, I prefer to use the sulfhydryl sulfonic acids as the thio acids. These have the advantage in that when they react with the initial trivalent arsenic compound they form acids which are themselves water soluble, and which also can react with alkalis to form water-soluble salts. In this respect, the derivatives obtained from the sulfhydryl sulfonic acids are different from those obtained from most other thio acids, in that with those other thio acids the acid formed by the reaction of the initial trivalent arsenic compound with the initial thio acid produces acids which are themselves not usually materially soluble in water, so that it is necessary to produce salts thereof in order to get the desired water solubility. In consequence, by using sulfhydryl sulfonic acids, it is possible to get an aqueous solution of any desired hydrogen ion concentration within a wide range extending on both sides of the neutral point.

Thus, if instead of using thiosalicylic acid in the reaction shown in equation (5), one uses p-sulfhydryl benzene sulfonic acid, instead of the reaction shown in equation (5), one would get the following reaction:

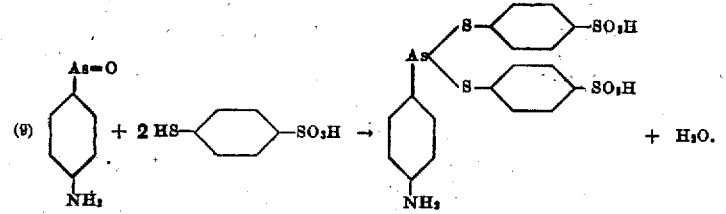

The acid produced by the above reaction is water soluble; and the solution of it may be given varying hydrogen ion concentrations by the addition of varying amounts of an alkali.

The effective compound thus produced thus contains a radical of the following general formula

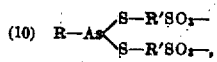

in which R' may be a suitable organic radical combinable with the SO₃ group to form a sulfonic acid. The radical shown in formula 10 is merely a more specific example of the radical shown in formula 8.

Further, if sulfhydryl sulfonic acids are used containing two sulfonic acid groups, such as 2-sulfhydryl-naphthyl-6; 8-disulfonic acid, it is possible to obtain final soluble arsenious compounds from some initial arsenious oxides which give only difficultly soluble final products when other thio acids are used.

I give below a few examples of the many compounds which come within the scope of the broader claims of the present invention; though such examples are meant as illustrations and not as limitations.

*Example 1.*

To 10.5 grams of p-dimethyl amino phenyl arsenious oxide suspended in 75 c. c. of alcohol is added a solution in alcohol of 15.4 grams of thiosalicylic acid. (Alcohol is not the only suitable solvent, as other solvents, such as acetone, may also be used.) The mixture is shaken for a while, and the p-dimethyl amino phenyl arsenious oxide goes into solution, with the following reaction:

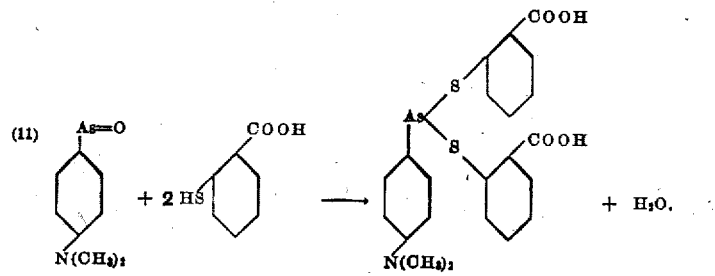

The reaction mixture is usually warmed for about five minutes at 40–50° C., and, if then not completely clear, is filtered. It is then treated with water, and cooled thoroughly. A precipitate separates, which is p-dimethyl amino phenyl arsenious thiosalicylic acid, having the formula of the first term on the right-hand side of the foregoing reaction equation. This precipitate is collected on a filter, washed well with water to remove any alcohol, and dried in a dessicator. This compound as ordinarily obtained is a faintly yellow crystalline substance which decomposes at slightly below 100°. It is soluble in alcohol and in ether. It is readily soluble in either sodium bicarbonate or sodium hydroxide to a practically neutral reaction, which makes it suitable for intravenous injection; whereas the p-dimethyl amino phenyl arsenious oxide is only soluble in strong sodium hydroxide solution, too alkaline for intravenous or subcutaneous use, and is practically insoluble either in sodium bicarbonate or sodium carbonate. In this neutral solution, the sodium has replaced the hydrogen of the acid, to form the following water-soluble sodium salt:

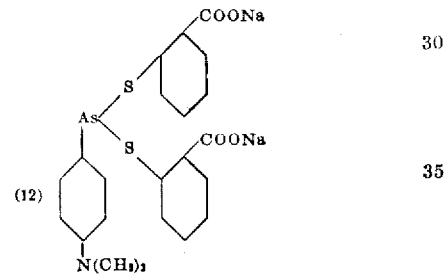

*Example 2.*

To 11.2 grams of p-acetyl amino phenyl arsenious oxide suspended in 75 c. c. of alcohol is added an alcoholic solution of 15.4 grams of thiosalicylic acid. The mixture is warmed very gently to 50–60° C. The p-acetyl amino phenyl arsenious oxide goes into solution, with the following reaction:

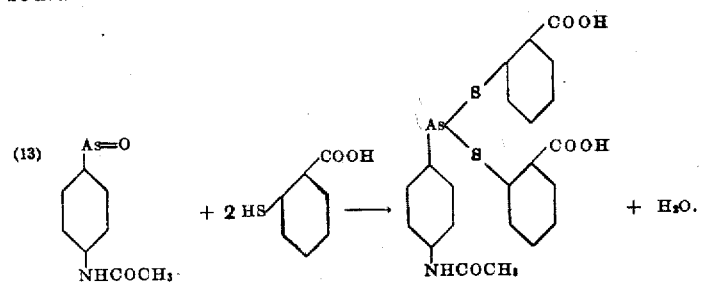

After about 10 to 15 minutes, the alcoholic solution is filtered and treated with water to precipitate the product formed, as in Example 1. This precipitate is separated on a filter, washed with water, and dried in a vacuum. It is the p-acetyl amino phenyl arsenious thiosalicylic acid, of the formula of the first term on the right-hand side of the reaction equation just given. It is a very light yellow crystalline substance. It melts at about 216° to 219° C. It is soluble in alcohol. When treated with sodium bicarbonate solution, it dissolves readily, the following reaction taking place:

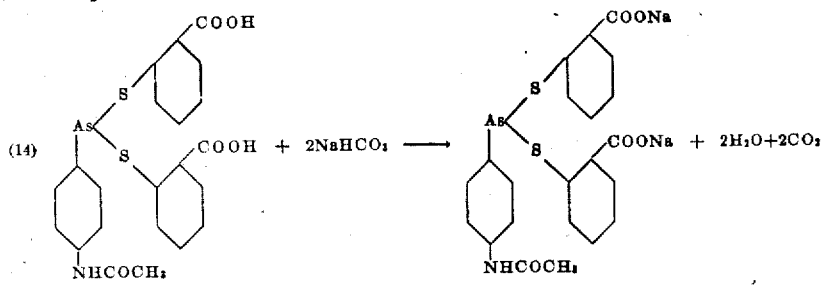

The sodium salt of p-acetyl amino phenyl arsenious thiosalicylic acid thus formed is soluble in water. A solution of this sodium salt, when injected intravenously, shows marked trypanocidal activity.

*Example 3.*

To 4.40 grams of p-amino phenylarsenious oxide dihydrate,

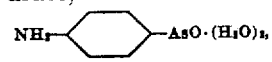

dissolved in a small volume of alcohol or acetone, is added gradually with stirring a concentrated alcoholic solution of 6.16 grams of thiosalicylic acid

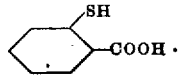

The mixed solution is warmed a few minutes at 50 to 60° C., and then allowed to stand a few hours at room temperature. The following reaction takes place:

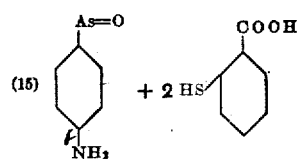 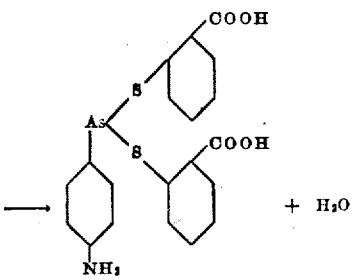

On concentrating at a low temperature a precipitate separates out, which is p-amino phenylarsenious thiosalicylic acid, having the structural formula of the first term on the right-hand side of the foregoing reaction equation. This precipitate may also be obtained by adding water to the alcoholic solution.

This precipitate is collected on a filter, washed with a little cold alcohol and water, and dried. As ordinarily obtained by the above method, this compound is a pale yellow crystalline substance which when rapidly heated turns brown at about 130° C., and which melts with decomposition at 145–160° C., depending on the rate of heating. If heated for several hours at 110° C. it decomposes into a brown tarry mass.

P-amino phenylarsenious thiosalicylic acid is practically insoluble in water, ether, and concentrated hydrochloric acid. It is slightly soluble in dilute hydrochloric acid, and readily soluble in dilute alkalis, alcohol, and acetone. It forms water-soluble salts with the alkali metals such as sodium and potassium, with ammonia, and with the alkaline earths such as calcium. The structural formula of the sodium salt is:

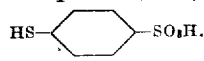

A solution of the sodium salt of p-amino phenylarsenious thiosalicylic acid, when injected intravenously, shows a marked trypanocidal activity.

*Example 4.*

To 2.43 grams of p-acetyl amino phenyl arsenious oxide monohydrate,

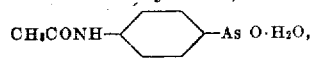

suspended in 50 cc. alcohol, is added gradually with stirring an alcoholic or aqueous solution containing 3.80 grams of p-sulfhydryl benzene sulphonic acid, $$HS-\langle\ \rangle-SO_3H.$$

A white precipitate forms during the addition of the sulphonic acid, and the suspension of the arsenious oxide goes into solution, indicating that the following reaction has taken place:

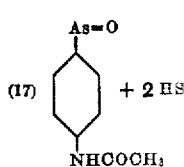 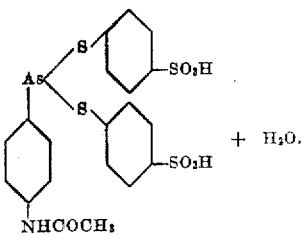

On continued stirring the reaction mixture becomes thick like a white paste, due to the formation of p-acetyl amino phenyl arsenious sulpho benzene sulphonic acid having the structural formula as indicated in the first term on the right-hand side of the foregoing reaction equation. When the reaction has been completed, the precipitate is collected on a filter, washed with alcohol, and dried in vacuo.

The p-acetyl amino phenyl arsenious sulpho benzene sulphonic acid is a pale cream or white crystalline substance which does not melt or darken when heated to 300° C. It is somewhat soluble in water and in dilute hydrochloric acid, can be precipitated from a saturated aqueous solution by the addition of concentrated hydrochloric acid, is readily soluble in dilute alkali, is slightly soluble in alcohol and acetone, and is insoluble in ether. It forms water-soluble salts with the alkali metals such as sodium and potassium, with ammonia, and with the alkaline-earth metals such as calcium. The structural formula of the sodium salt is:

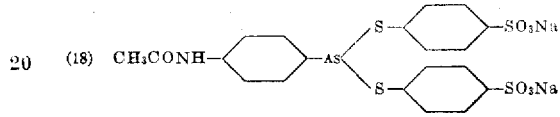

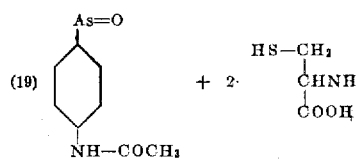

After standing 24 hours at room temperature, the white crystalline precipitate having the structural formula shown in the first term on the right hand side of the foregoing reaction equation, is filtered off and washed with alcohol and dried in vacuo. It decomposes at 196–198° C. with foaming. This compound is soluble in water, in concentrated hydrochloric acid, and in dilute alkali. It is slightly soluble in alcohol, and insoluble in acetone and ether. It forms water-soluble salts with the alkali metals such as sodium and potassium, with ammonia, and with the alkaline-earth metals such as calcium. The formula for the sodium salt is:—

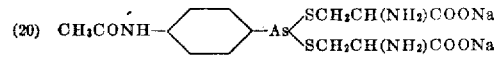

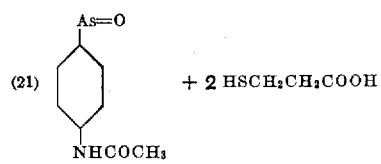

The product of the reaction, p-acetyl amino phenyl arsenious sulfo-propionic acid, having the structural formula of the first term on the right-hand side of the foregoing reaction equation, is soluble in alcohol, and so may be isolated as follows:—The alcoholic solution is concentrated to a small volume, and water is added, whereupon a precipitate forms. This precipitate is filtered A solution of the sodium salt of p-acetyl amino phenyl arsenious sulpho benzene sulphonic acid shows a marked trypanocidal activity, and is less toxic than an amount of the arsenious oxide having the same quantity of arsenic.

*Example 5.*

To 1.22 grams of p-acetyl amino phenyl arsenious oxide monohydrate,

dissolved in 75 c. c. of warm ethyl alcohol, is added a concentrated solution of 1.70 grams of cysteine hydrochloride in water or alcohol. After a few minutes stirring a reaction is indicated by the fact that a precipitate begins to form. The following reaction takes place:—

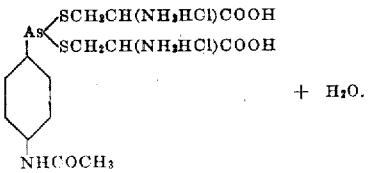

A solution of this sodium salt shows a marked trypanocidal activity, and is less toxic than that amount of the arsenious oxide which contains an equal quantity of arsenic.

*Example 6.*

To 1.22 grams of p-acetyl amino phenyl arsenious oxide monohydrate,

dissolved or suspended in 25 to 50 c. c. of alcohol, is added with stirring an alcoholic solution of 1.10 grams of b-sulfhydryl propionic acid, $HS-CH_2CH_2CO_2H$. The reaction mixture may be warmed 5 minutes at 50 to 60° C. The following reaction takes place:

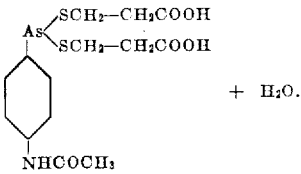

off, dried, and then suspended in ether, from which it is obtained by filtration as a pale yellow or white powder, melting at 120–126°. The reaction product also may be obtained by evaporating the alcohol until a curdy residue remains, at which point ether is added and the insoluble portion collected on a filter, washed with ether, and dried.

The p-acetyl amino phenyl arsenious sulfo-propionic acid, of the foregoing formula, is soluble in warm water, in alcohol, in acetone, and in dilute alkali, but is insoluble in concentrated hydrochloric acid and in ether. It forms water-soluble salts with the alkali metals such as sodium and potassium, and with ammonia. The calcium salt is but slightly soluble in water.

The formula for the sodium salt is:—

(22) 

A solution of the sodium salt of p-acetyl amino phenyl arsenious sulfo-propionic acid shows a marked trypanocidal activity, and is less toxic than an amount of the arsenious oxide containing the same quantity of arsenic.

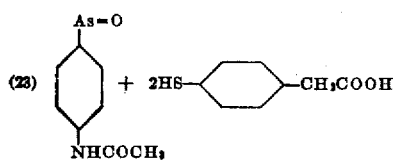

On cooling a pale yellow colored precipitate forms, which is p-acetyl amino phenyl arsenious sulfo phenyl acetic acid, having the structural formula of the first term on the right hand side of the foregoing reaction equation. Upon evaporating the alcohol to a small volume, further amounts of the p-acetyl amino phenyl arsenious sulfo phenyl acetic acid are separated from the solution. The precipitate is collected on a filter, washed with cold alcohol, and dried. The compound as ordinarily obtained from the above described reaction is a pale yellow crystalline substance, which may be further

(24) 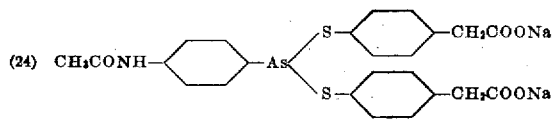

A solution of the sodium salt of p-acetyl amino phenyl arsenious sulfo phenyl acetic acid shows a marked trypanocidal activity, and is less toxic than an amount of the arsenious oxide containing the same quantity of arsenic.

*Example 8.*

To 2.20 grams of p-amino phenyl arsenious oxide dihydrate,

(25) 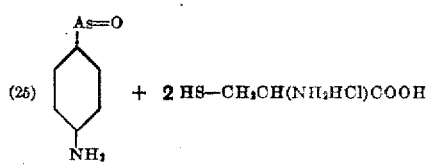

The precipitate which separates is p-amino phenyl arsenious cysteine hydro-

*Example 7.*

To 1.22 grams of p-acetyl amino phenyl arsenious oxide monohydrate,

suspended or dissolved in a suitable amount of alcohol, (25–75 c. c.) is added with stirring a concentrated alcohol solution of 1.68 gms. of p-sulfhydryl phenyl acetic acid,

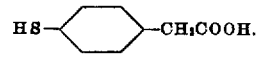

The combined alcoholic solutions remain clear, and are warmed a few minutes at 50 to 60° C. The following reaction takes place:—

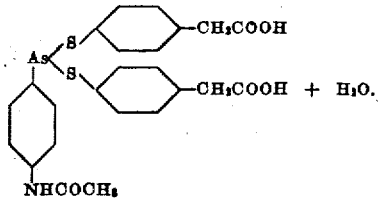

purified by recrystallizing from alcohol. It melts at 200–203° C., with a slight preliminary decomposition as indicated by the appearance of a brown color about 190–195° C.

It is insoluble in water, in dilute or concentrated hydrochloric acid, and in ether. It readily dissolves in dilute alkali, and is somewhat soluble in acetone and ethyl alcohol. It forms water-soluble salts with the alkali metals such as sodium and potassium, and with ammonia, but its calcium salt is insoluble. The structural formula of the sodium salt is:

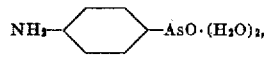

dissolved in 25 to 50 c. c. of warm alcohol, is added gradually with stirring a concentrated alcoholic solution of 3.40 grams cysteine hydrochloride. A white precipitate forms during this addition, indicating that a reaction has taken place. The following equation represents this reaction:—

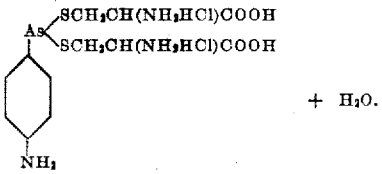

chloride, having the formula of the first term on the right hand side of the foregoing reaction equation. This precipitate is collected on a filter, washed with a little alcohol, and dried in vacuo. The compound as ordinarily obtained is a white crystalline substance, which darkens when heated to 160–165° C., and decomposes when heated to higher temperatures.

It is soluble in water with an acid reaction, giving a precipitate on neutralizing. It is also soluble in dilute alkali, dilute acid, and concentrated hydrochloric acid; it is slightly soluble in alcohol and acetone, and is insoluble in ether. It forms water-soluble salts with the alkali metals such as sodium and potassium, with ammonia, and with the alkaline-earth metals such as calcium. The structural formula of the sodium salt is:—

(26) 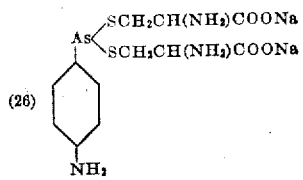

(27) 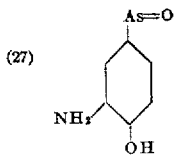

This precipitate, which is 4-hydroxy 3-amino phenyl arsenious sulfobenzene sulfonic acid having the structural formula of the first term on the right-hand side of the foregoing reaction equation, is collected on a filter, washed with a little water and dried. The compound as ordinarily obtained by the above method is a white or pale yellow crystalline substance, which melts with decomposition at 265–280° C., the exact temperature depending upon the rate of heating.

It is soluble in water, dilute acids, and alkalis, slightly soluble in alcohol and acetone, and insoluble in ether. It forms water-soluble salts with the alkali metals such as sodium or potassium, with ammonia, and with the alkaline-earth metals such as calcium. The structural formula of the sodium salt is:—

(28) 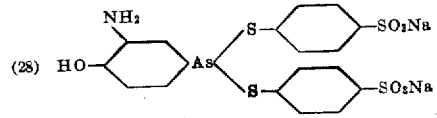

A solution of the sodium salt of p-amino phenyl arsenious cysteine shows a marked trypanocidal activity.

*Example 9.*

To 1.567 grams of 4-hydroxy 3-amino phenyl arsenious oxide.

dissolved in a small quantity of water, is added gradually with stirring a concentrated aqueous solution containing 3.4 gms. of p-sulfhydryl benzene sulfonic acid,

(Ether alcohol or acetone may be used as solvents instead of water). The formation of a white precipitate is evidence of the fact that a reaction has occurred; which is as follows:—

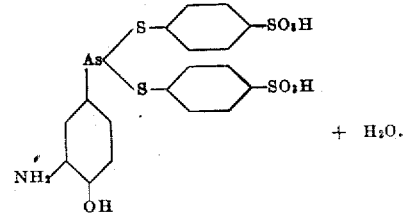

A solution of the sodium salt of 4-hydroxy 3-amino phenyl arsenious sulfobenzene sulfonic acid shows a marked trypanocidal activity, and is less toxic than an amount of the arsenious oxide containing the same quantity of arsenic.

*Example 10.*

To 1.63 grams of 4-hydroxy 3-amino phenyl arsenious oxide,

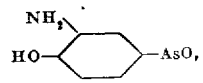

dissolved in a small quantity of water, is added gradually with stirring an alcoholic solution of 2.55 grams of thiosalicylic acid,

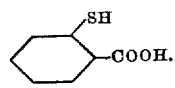

The following reaction takes place:—

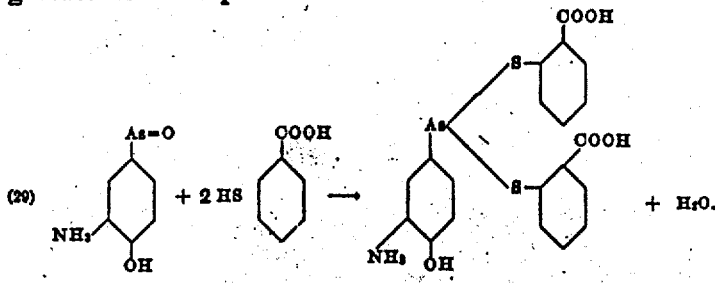

The solution is warmed a few minutes at 50 to 60° C. to complete the reaction, and then concentrated to a small volume, whereupon a precipitate forms; which contains 4-hydroxy 3-amino phenyl arsenious thiosalicylic acid, having the structural formula, of stance, having an indefinite melting point, decomposing when heated. It is insoluble in water and in ether, and is moderately soluble in alcohol and in acetone. It is soluble in dilute alkali. It forms water-soluble salts with the alkali metals such as sodium or potassium, with ammonia, and with the alkaline-earth metals such as calcium. The structural formula of sodium salt is:—

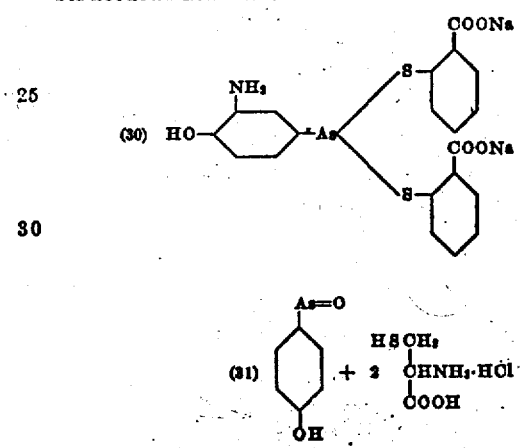

After standing 16 hours at room temperature, the white crystalline precipitate having the structural formula as shown in the first term on the right hand side of the foregoing reaction equation is filtered off and washed with acid alcohol and dried. It decomposes sharply at 205°–206° C. with much foaming. This compound is soluble in water, dilute acid, alkali, and concentrated hydrochloric acid. It is insoluble in ethyl alcohol, acetone, and ether. It forms water soluble salts with the alkali metals such as sodium and potassium, with ammonia, and with the alkali earth metals such as calcium. The formula for the sodium salt is:—

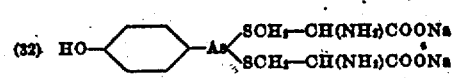

A solution of the sodium salt of p-hythe first term on the right-hand side of the foregoing reaction equation. This precipitate is collected on a filter, washed with water, and dried.

The compound as ordinarily obtained by the above method is a cream-colored substance.

A solution of the sodium salt of 4-hydroxy 3-amino phenyl arsenious thiosalicylic acid shows a marked trypanocidal activity, and is less toxic than an amount of the arsenious oxide containing the same quantity of arsenic.

*Example 11.*

To 0.242 grams of p-hydroxyphenyl arsine oxide,

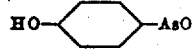

dissolved in 10 c. c. of ethyl alcohol, is added a solution of 0.42 grams of cysteine hydrochloride in ethyl alcohol. After a few minutes stirring a reaction is indicated by the formation of a flocculent precipitate. The following reaction takes place:—

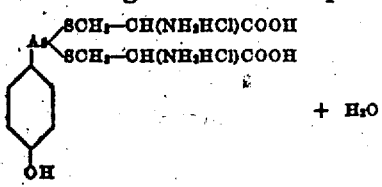

droxyphenyl arsenious cysteine shows a marked trypanocidal activity.

*Example 12.*

To an alcoholic solution or suspension of 0.48 grams of 3-acetylamino 4-hydroxyphenyl arsenious oxide,

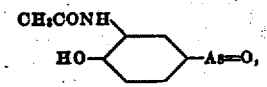

(prepared by reducing 3-amino 4-hydroxyphenyl arsonic acid with $SO_2$ in the presence of HI to 3-amino 4-hydroxy phenyl arsenious oxide, and acetylating the amino group of the latter compound,) is added 0.50 grams of β-sulfhydryl propionic acid,

If the solution is not clear, it is warmed on the water bath until it is so. The following reaction takes place:—

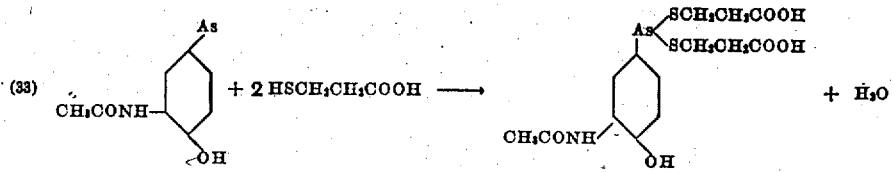

The product of the reaction, 3-acetylamino 4-hydroxyphenyl arsenious sulfopropionic acid, having the structural formula of the first term on the right hand side of the foregoing reaction equation, being soluble in alcohol, may be isolated as follows:—The alcoholic solution is concentrated to a small volume, and ether is added, whereupon a precipitate forms. This precipitate is filtered off, washed with ether, and dried. The product as usually obtained is a pale yellow or white solid melting at 140–144° C.

The 3-acetylamino 4-hydroxyphenyl arsenious sulfopropionic acid is somewhat soluble in water, and in dilute hydrochloric acid. It is readily soluble in dilute alkali, alcohol, and acetone, and is almost insoluble in ether. It forms water-soluble salts with the alkali metals such as sodium and potassium, with ammonia, and with calcium.

The formula for the sodium salt is:—

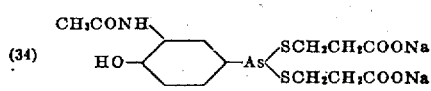

A solution of the sodium salt of 3-acetylamino 4-hydroxyphenyl arsenious sulfopropionic acid shows a marked trypanocidal activity, and is less toxic than an amount of the arsenious oxide containing the same quantity of arsenic.

*Example 13.*

To 0.6 grams of p-hydroxyphenylarsenious oxide,

dissolved in a small volume of alcohol or acetone, is added gradually with stirring a hot concentrated alcoholic solution containing 1.26 grams of p-sulfhydrylbenzene sulfonic acid,

A precipitate starts forming immediately, and the mixed solutions are allowed to stand two or three hours at room temperature in order to complete the reaction. The following reaction takes place:—

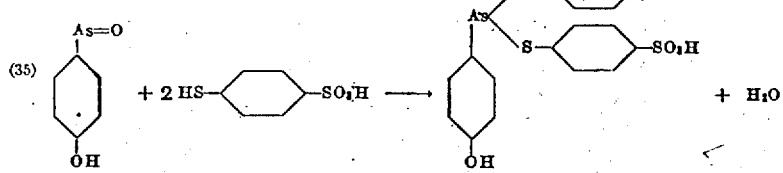

The precipitate which separates in the above reaction is p-hydroxyphenyl arsenious sulfo benzene sulfonic acid having the structural formula of the first term on the right hand side of the foregoing reaction equation.

This precipitate is collected on a filter, washed with a little cold alcohol, and dried. As ordinarily obtained by the above method, this compound is a white crystalline substance which does not melt or show any signs of decomposition when heated to 300° C.

P-hydroxyphenyl arsenious sulfo benzene sulfonic acid is insoluble in alcohol, acetone, or ether. It is quite readily soluble in water, dilute hydrochloric acid, dilute alkalis, and concentrated hydrochloric acid. It forms water-soluble salts with the alkali metals such as sodium and potassium, and with ammonia; while the salts with the alkaline earth metals such as calcium are only moderately soluble in water. The structural formula of the sodium salt is:—

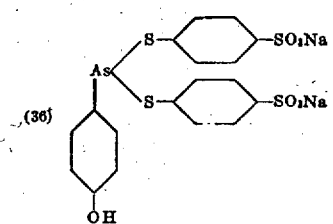

A solution of the sodium salt of p-hydroxyphenyl arsenious sulfo benzene sulfonic acid shows a marked trypanocidal activity.

Example 14.

To 0.72 grams of 3-acetylamino 4-hydroxyphenyl arsenious oxide,

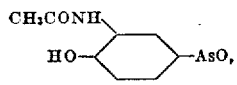

suspended or dissolved in 50 c. c. alcohol, is added gradually with stirring in alcoholic solution containing 1.15 grams of p-sulfhydryl benzene sulfonic acid,

A white precipitate forms during the addition of the sulfonic acid, and on continued stirring the reaction mixture becomes thick like a white paste. The following reaction takes place:—

(37) 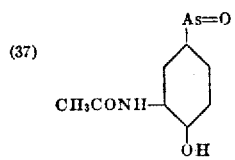  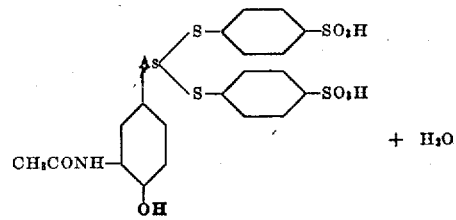 + H₂O

The whitish precipitate, which is 3-acetylamino 4-hydroxyphenyl arsenious sulfo benzene sulfonic acid having the structural formula as indicated in the first term on the right-hand side of the foregoing reaction equation, is collected on a filter, washed with alcohol, and dried in vacuo. When dry it is a pale cream or white crystalline substance which does not melt or darken when heated to 300° C. It is soluble in water, dilute hydrochloric acid, and dilute alkali. It is practically insoluble in alcohol, acetone, and ether. It forms water-soluble salts with the alkali metals such as sodium and potassium, with ammonia, and with the alkaline-earth metals such as calcium. The structural formula of the sodium salt is:—

(38) 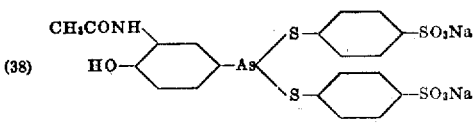

A solution of the sodium salt of 3-acetylamino 4-hydroxyphenyl arsenious sulfo benzene sulfonic acid shows a marked trypanocidal activity, and is less toxic than an amount of the arsenious oxide having the same quantity of arsenic.

I claim as my invention:—

1. The step in the method of producing water-soluble compounds of organic arsenious compounds, which comprises treating, in a solvent, an arsenious compound in which at least one valence bond of the arsenic is attached to an inorganic radical of other than the sulphur family (sulphur, selenium, and tellurium) and at least one valence bond of the arsenic is directly attached to a carbon atom of an organic radical, with an organic compound containing both an acid radical and a sulfhydryl group and having the sulfhydryl group directly attached to a carbon atom.

2. The step in the method of producing water-soluble compounds of organic arsenious compounds, which comprises treating, in a solvent, an arsenious compound in which at least one valence bond of the arsenic is attached to an inorganic radical of other than the sulphur family (sulphur, selenium, and tellurium) and at least one valence bond of the arsenic is directly attached to a carbon atom of an organic radical of the aromatic series, with an organic compound containing both an acid radical and a sulfhydryl group and having the sulfhydryl group directly attached to a carbon atom.

3. The step in the method of producing water-soluble compounds of organic arsenious compounds, which comprises treating, in a solvent, an arsenious compound in which at least one valence bond of the arsenic is attached to on inorganic radical of other than the sulphur family (sulphur, selenium, and tellurium) and at least one valence bond of the arsenic is directly attached to a carbon atom of a substituted aromatic radical, with an organic compound containing both an acid radical and a sulfhydryl group and having the sulfhydryl group directly attached to a carbon atom.

4. The step in the method of producing water-soluble compounds of organic arsenious compounds, which comprises treating, in a solvent, an arsenious compound in which at least one valence bond of the arsenic is attached to an inorganic radical of other than the sulphur family (sulphur, selenium, and tellurium) and at least one valence bond of the arsenic is directly attached to a carbon atom of a substituted phenyl radical, with an organic compound containing both an acid radical and a sulfhydryl group and having the sulfhydryl group directly attached to a carbon atom.

5. The step in the method of producing water-soluble compounds of organic arsenious compounds, which comprises treating, in a solvent, a compound of the formula R—As=Y, in which Y comprises one or more replaceable inorganic radicals or groups other than of the sulphur family (sulphur, selenium, and tellurium) and having a total valence of two, and in which R is an organic radical having a carbon atom to which the arsenic is directly attached, with an organic compound containing both an acid radical and a sulfhydryl group and having the sulfhydryl group directly attached to a carbon atom.

6. The step in the method of producing water-soluble compounds of organic arsenious compounds, which comprises treating, in a solvent, a compound of the formula R—As=Y, in which Y comprises one or more replaceable inorganic radicals or groups other than of the sulphur family (sulphur, selenium, and tellurium) and having a total valence of two, and in which R is a substituted aromatic radical having a carbon atom to which the arsenic is directly attached, with an organic compound containing both an acid radical and a sulfhydryl group and having the sulfhydryl group directly attached to a carbon atom.

7. The step in the method of producing water-soluble compounds of organic arsenious compounds, which comprises treating, in a solvent, a compound of the formula R—As=O, in which R is an organic radical having a carbon atom to which the arsenic is directly attached, with an organic compound containing both an acid radical and a sulfhydryl group and having the sulfhydryl group directly attached to a carbon atom.

8. The step in the method of producing water-soluble compounds of organic arsenious compounds, which comprises treating, in a solvent, a compound of the formula R—As=O, in which R is a substituted aromatic radical having a carbon atom to which the arsenic is directly attached, with an organic compound containing both an acid radical and a sulfhydryl group and having the sulfhydryl group directly attached to a carbon atom.

9. An arsenious organic compound, in which at least one bond of a trivalent-arsenic atom is attached to a carbon atom of an organic radical, and at least one other bond of the trivalent arsenic atom is attached to a sulphur atom, and the sulphur is also attached to a carbon atom of an organic radical containing an acid group which has a free valence bond capable of being attached either to hydrogen or to a metal.

10. An arsenious organic compound, in which at least one bond of a trivalent-arsenic atom is attached to a carbon atom of an aromatic radical, and at least one other bond of the trivalent arsenic atom is attached to a sulphur atom, and the sulphur is also attached to a carbon atom of an organic radical containing an acid group which has a free valence bond capable of being attached either to hydrogen or to a metal.

11. An arsenious organic compound, in which at least one bond of a trivalent-arsenic atom is attached to a carbon atom of a substituted aromatic radical, and at least one other bond of the trivalent arsenic atom is attached to a sulphur atom, and the sulphur is also attached to a carbon atom of an organic radical containing an acid group which has a free valence bond capable of being attached either to hydrogen or to a metal.

12. An arsenious organic compound, in which at least one bond of a trivalent-arsenic atom is attached to a carbon atom of a substituted phenyl radical, and at least one other bond of the trivalent arsenic atom is attached to a sulphur atom, and the sulphur is also attached to a carbon atom of an organic radical containing an acid group which has a free valence bond capable of being attached either to hydrogen or to a metal.

13. A compound containing the following radical:

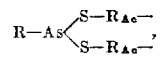

where R is any organic radical having a carbon atom directly attached to the arsenic, and $R_{Ac}$ is an organic radical having a carbon atom directly attached to the sulphur atom and containing an acid group which has a free valence bond capable of being attached either to hydrogen or to a metal.

14. A compound containing the following radical:

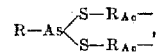

where R is an aromatic radical having a carbon atom directly attached to the arsenic, and $R_{Ac}$ is an organic radical having a carbon atom directly attached to the sulphur atom and containing an acid group which has a free valence bond capable of being attached either to hydrogen or to a metal.

15. A compound containing the following radical:

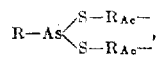

where R is a substituted aromatic radical having a carbon atom directly attached to the arsenic, and $R_{Ac}$ is an organic radical having a carbon atom directly attached to the sulphur atom and containing an acid group which has a free valence bond capable of being attached either to hydrogen or to a metal.

16. A compound containing the following radical:

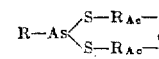

where R is a substituted phenyl radical having a carbon atom directly attached to the arsenic, and $R_{Ac}$ is an organic radical having a carbon atom directly attached to the sulphur atom and containing an acid group which has a free valence bond capable of being attached either to hydrogen or to a metal.

17. A compound containing the following radical:

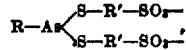

where R is any organic radical having a carbon atom directly attached to the arsenic, and R' is an organic radical which has a carbon atom directly attached to the sulfide sulphur atom and which is combinable with an $SO_3$ group to form a sulfonic acid.

18. A compound containing the following radical:

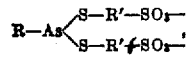

where R is an aromatic radical having a carbon atom directly attached to the arsenic, and R' is an organic radical which has a carbon atom directly attached to the sulfide sulphur atom and which is combinable with an $SO_3$ group to form a sulfonic acid.

19. A compound containing the following radical:

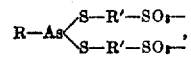

where R is a substituted aromatic radical having a carbon atom directly attached to the arsenic, and R' is an organic radical which has a carbon atom directly attached to the sulfide sulphur atom and which is combinable with an $SO_3$ group to form a sulfonic acid.

20. A compound containing the following radical:

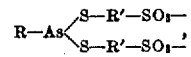

where R is a substituted phenyl radical having a carbon atom directly attached to the arsenic, and R' is an organic radical which has a carbon atom directly attached to the sulfide sulphur atom and which is combinable with an $SO_3$ group to form a sulfonic acid.

21. A compound containing the following radical:

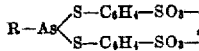

in which R is any organic radical having a carbon atom directly attached to the arsenic.

22. A compound containing the following radical:

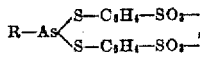

in which R is an aromatic radical having a carbon atom directly attached to the arsenic.

23. A compound containing the following radical:

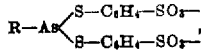

in which R is a substituted aromatic radical having a carbon atom directly attached to the arsenic.

24. A compound containing the following radical:

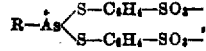

in which R is a substituted phenyl radical having a carbon atom directly attached to the arsenic.

25. A compound containing the following radical:

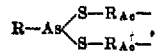

where R is a substituted phenyl radical having a carbon atom directly attached to the arsenic, and $R_{Ac}$ is an aromatic radical having a carbon atom directly attached to the sulphur atom and containing an acid group which has a free valence bond capable of being attached either to hydrogen or to a metal.

26. A compound containing the following radical:

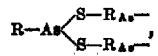

where R is a substituted phenyl radical having a carbon atom directly attached to the arsenic, and $R_{Ac}$ is a substituted aromatic radical having a carbon atom directly attached to the sulphur atom and containing an acid group which has a free valence bond capable of being attached either to hydrogen or to a metal.

27. A compound containing the following radical:

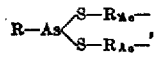

where R is a substituted phenyl radical having a carbon atom directly attached to the arsenic, and $R_{Ac}$ is an aromatic radical having a carbon atom of its nucleus directly attached to the sulphur atom and containing an acid group which has a free valence bond capable of being attached either to hydrogen or to a metal.

28. A compound containing the following radical:

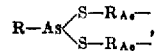

where R is a substituted phenyl radical having a carbon atom directly attached to the arsenic, and $R_{Ac}$ is a substituted aromatic radical having a carbon atom of its nucleus directly attached to the sulphur atom and containing an acid group which has a free valence bond capable of being attached either to hydrogen or to a metal.

29. A compound containing the following radical:

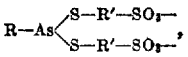

where R is a substituted phenyl radical having a carbon atom directly attached to the arsenic, and R' is an aromatic radical combinable with a $SO_3$ group to form a sulfonic acid and having a carbon atom directly attached to the sulfide sulphur atom.

30. A compound containing the following radical:

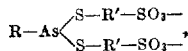

where R is a substituted phenyl radical having a carbon atom directly attached to the arsenic, and R' is a substituted aromatic radical combinable with a $SO_3$ group to form a sulfonic acid and having a carbon atom directly attached to the sulfide sulphur atom.

31. A compound containing the following radical:

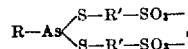

where R is a substituted phenyl radical having a carbon atom directly attached to the arsenic, and R' is an aromatic radical combinable with a $SO_3$ group to form a sulfonic acid and having a carbon atom of its nucleus directly attached to the sulfide sulphur atom.

32. A compound containing the following radical:

where R is a substituted phenyl radical having a carbon atom directly attached to the arsenic, and R' is a substituted aromatic radical combinable with a $SO_3$ group to form a sulfonic acid and having a carbon atom of its nucleus directly attached to the sulfide sulphur atom.

33. A water-soluble compound containing the following radical:

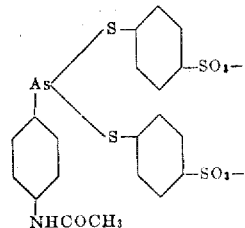

34. A water-soluble compound having the following formula:

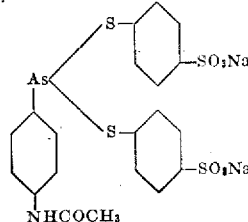

In witness whereof, I have hereunto set my hand at College Park, Maryland, this 19th day of January, A. D. one thousand nine hundred and twenty seven.

MORRIS S. KHARASCH.

---

CERTIFICATE OF CORRECTION.

Patent No. 1,677,392.      Granted July 17, 1928, to

MORRIS S. KHARASCH.

It is hereby certified that error appears in the above numbered patent requiring correction as follows: In the grant, and in the heading to the printed specification, the residence of the patentee is erroneously written and printed "College Park, Indiana", whereas said residence should have been written and printed as "College Park, Maryland"; page 6, line 97, after "120-126°" insert the capital letter "C"; page 10, in the upper right hand corner of formula 35, the radical should appear as "SO sub 3 H" instead of with a vertical line preceding the letter "H"; page 11, line 10, for the word "in" read "an"; and that the said Letters Patent should be read with these corrections therein that the same may conform to the record of the case in the Patent Office.

Signed and sealed this 14th day of January, A. D. 1930.

M. J. Moore,
Acting Commissioner of Patents.

(Seal)

arsenic, and R' is an aromatic radical combinable with a SO₃ group to form a sulfonic acid and having a carbon atom directly attached to the sulfide sulphur atom.

30. A compound containing the following radical:

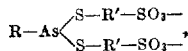

where R is a substituted phenyl radical having a carbon atom directly attached to the arsenic, and R' is a substituted aromatic radical combinable with a SO₃ group to form a sulfonic acid and having a carbon atom directly attached to the sulfide sulphur atom.

31. A compound containing the following radical:

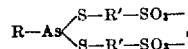

where R is a substituted phenyl radical having a carbon atom directly attached to the arsenic, and R' is an aromatic radical combinable with a SO₃ group to form a sulfonic acid and having a carbon atom of its nucleus directly attached to the sulfide sulphur atom.

32. A compound containing the following radical:

where R is a substituted phenyl radical having a carbon atom directly attached to the arsenic, and R' is a substituted aromatic radical combinable with a SO₃ group to form a sulfonic acid and having a carbon atom of its nucleus directly attached to the sulfide sulphur atom.

33. A water-soluble compound containing the following radical:

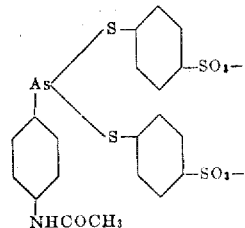

34. A water-soluble compound having the following formula:

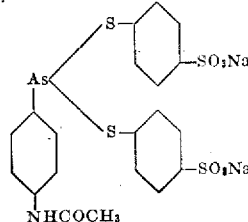

In witness whereof, I have hereunto set my hand at College Park, Maryland, this 19th day of January, A. D. one thousand nine hundred and twenty seven.

MORRIS S. KHARASCH.

---

CERTIFICATE OF CORRECTION.

Patent No. 1,677,392.   Granted July 17, 1928, to

MORRIS S. KHARASCH.

It is hereby certified that error appears in the above numbered patent requiring correction as follows: In the grant, and in the heading to the printed specification, the residence of the patentee is erroneously written and printed "College Park, Indiana", whereas said residence should have been written and printed as "College Park, Maryland"; page 6, line 97, after "120-126°" insert the capital letter "C"; page 10, in the upper right hand corner of formula 35, the radical should appear as "SO sub 3 H" instead of with a vertical line preceding the letter "H"; page 11, line 10, for the word "in" read "an"; and that the said Letters Patent should be read with these corrections therein that the same may conform to the record of the case in the Patent Office.

Signed and sealed this 14th day of January, A. D. 1930.

M. J. Moore,
Acting Commissioner of Patents.

(Seal)